(12) United States Patent
Mori et al.

(10) Patent No.: US 9,381,848 B2
(45) Date of Patent: Jul. 5, 2016

(54) INFORMATION PROVISION DEVICE FOR VEHICLE

(71) Applicant: DENSO CORPORATION, Kariya, Aichi-pref. (JP)

(72) Inventors: Takuya Mori, Anjo (JP); Yuji Nonoyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/649,728

(22) PCT Filed: Dec. 19, 2013

(86) PCT No.: PCT/JP2013/007450
§ 371 (c)(1),
(2) Date: Jun. 4, 2015

(87) PCT Pub. No.: WO2014/097629
PCT Pub. Date: Jun. 26, 2014

(65) Prior Publication Data
US 2015/0314722 A1    Nov. 5, 2015

(30) Foreign Application Priority Data

Dec. 21, 2012  (JP) ................................. 2012-279869
Dec. 6, 2013   (JP) ................................. 2013-253323

(51) Int. Cl.
*B60Q 1/00*      (2006.01)
*G01C 21/36*     (2006.01)

(52) U.S. Cl.
CPC .............. *B60Q 1/00* (2013.01); *G01C 21/3629* (2013.01)

(58) Field of Classification Search
CPC ....... G06F 8/62; G06F 9/4411; G06F 3/1204; G06F 3/1208; G06F 3/1267; G06F 3/1288; H04B 10/1141; H04B 10/116; B60Q 1/00; G01C 21/3629; G07C 5/008; G07C 5/085; H04N 1/00222; H04N 2201/0015

USPC ................. 340/439, 990, 994, 995.1, 995.17, 340/995.26, 441, 435–437, 460, 461, 476
See application file for complete search history.

(56) References Cited

U.S. PATENT DOCUMENTS 5,343,399 A * 8/1994 Yokoyama ......... G01C 21/3629
                                                    340/990
5,555,502 A * 9/1996 Opel .................. B60H 1/00985
                                                    701/36

(Continued)

FOREIGN PATENT DOCUMENTS

JP       2006347296 A    12/2006
JP       2007-328612 A   12/2007

(Continued)

OTHER PUBLICATIONS

International Search Report and Written Opinion of the International Searching Authority dated Feb. 18, 2014 issued in the corresponding International application No. PCT/JP2013/007450 (and English translation).

(Continued)

*Primary Examiner* — Daniel Previl
(74) *Attorney, Agent, or Firm* — Posz Law Group, PLC

(57) ABSTRACT

An information provision device for a vehicle is provided. The information provision device comprises an output device that reports notification information to a driver of the vehicle through an audible or visible message, an information selection unit that selects the notification information from among information items based on content of a driving operation of the vehicle, a preference determination unit that determines a reporting manner of the audible or visual message in the output device based on preference of the driver, and an output control unit that controls the output device in such a way that the notification information, which is selected by the information selection unit, is reported in the reporting manner determined by the preference determination unit.

8 Claims, 7 Drawing Sheets

(56) References Cited

U.S. PATENT DOCUMENTS

| | | | | |
|---|---|---|---|---|
| 5,935,193 | A | * | 8/1999 | Saiki .................. G01C 21/36 340/990 |
| 6,249,720 | B1 | * | 6/2001 | Kubota .............. B60R 16/0232 340/990 |
| 2006/0235615 | A1 | * | 10/2006 | Kato ..................... B60W 40/04 701/300 |
| 2011/0178689 | A1 | * | 7/2011 | Yasui ....................... B60T 7/12 701/70 |
| 2013/0302756 | A1 | | 11/2013 | Takeuchi et al. |

FOREIGN PATENT DOCUMENTS

| | | |
|---|---|---|
| JP | 2008-128745 A | 6/2008 |
| JP | 2010-271794 A | 12/2010 |
| WO | 2010084580 A1 | 7/2010 |

OTHER PUBLICATIONS

Office Action mailed Jun. 2, 2015 in the corresponding JP application No. 2013-253323 (English translation attached).

* cited by examiner

RUN-START SCENE

CURVE RUNNING SCENE

CUT-IN RUNNING SCENE

INFORMATION PROVISION DEVICE FOR VEHICLE

CROSS-REFERENCE TO RELATED APPLICATIONS

This application is a U.S. national stage application of International Patent Application No. PCT/JP2013/007450 filed on Dec. 19, 2013 and is based on Japanese Patent Applications No. 2012-279869 filed on Dec. 21, 2012 and No. 2013-253323 filed on Dec. 6, 2013, the disclosures of which are incorporated herein by reference.

TECHNICAL FIELD

The present disclosure relates to an information provision device for a vehicle that provides information to a driver of the vehicle based on contents of driving operations performed to drive the vehicle.

BACKGROUND

In response to the driving operation performed by a driver of a vehicle, a known system (for instance, in Patent Literature 1) evaluates the appropriateness of the contents of the driving operation and feeds the result of evaluation back to the driver. For example, the degree of driving safety is evaluated based on an accelerator operation (contents of driving operation). If the degree of driving safety is high, a voice message such as "an appropriate accelerator operation" is output.

PATENT LITERATURE

PATENT LITERATURE 1: Japanese Unexamined Patent Application Publication No. 2010-271794

SUMMARY

However, the system described in Patent Literature 1 outputs predetermined voice messages based on the result of evaluation. The voice messages do not vary with the preferences of the driver. Therefore, the drive may become bored with the voice messages.

The present disclosure has been made in view of the foregoing and has an object to provide an information provision device for a vehicle that provides information in such a manner as to prevent a driver of the vehicle from becoming bored.

According to an example of the present disclosure, there is provided an information provision device for a vehicle comprising: an output device that reports notification information to a driver of the vehicle through an audible or visible message; an information selection unit that selects the notification information from among a plurality of information items based on content of a driving operation of the vehicle; a preference determination unit that determines a reporting manner of the audible or visual message in the output device based on preference of the driver; and an output control unit that controls the output device in such a way that the notification information, which is selected by the information selection unit, is reported in the reporting manner determined by the preference determination unit.

According to the above-described information provision device for a vehicle, when the notification information, which depends on content of a driving operation, is to be reported by generating an audible or visible message, the notification information reporting manner varies based on the preference of the driver. For example, if the vehicle does not exhibit a significant front-rear rocking motion when a vehicle start operation is performed, the manner of reporting the voice massage as the notification information indicative of a desirable driving operation is adjustable to match the preference of the driver on the basis, for instance, of the gender, personality, voice tone, language, and dialect. Consequently, the information indicative, for instance, of a desirable driving operation is provided to the driver in a manner that does not bore the driver.

BRIEF DESCRIPTION OF DRAWINGS

The above and other objects, features, and advantages of the present disclosure will become more apparent from the following detailed description given in conjunction with the accompanying drawings, in which.

DETAILED DESCRIPTION

A plurality of embodiments will now be described with reference to the accompanying drawings. If only some elements in an embodiment are described, the remaining elements of the embodiment may be configured in the same manner as described in conjunction with a foregoing embodiment. Further, combinable elements are not limited to those expressly described in conjunction with individual embodiments. Elements in a plurality of embodiments may be partially combined even if such a combination is not expressly described, and as far as such a combination does not cause any problem.

(First Embodiment)

Figure 1:
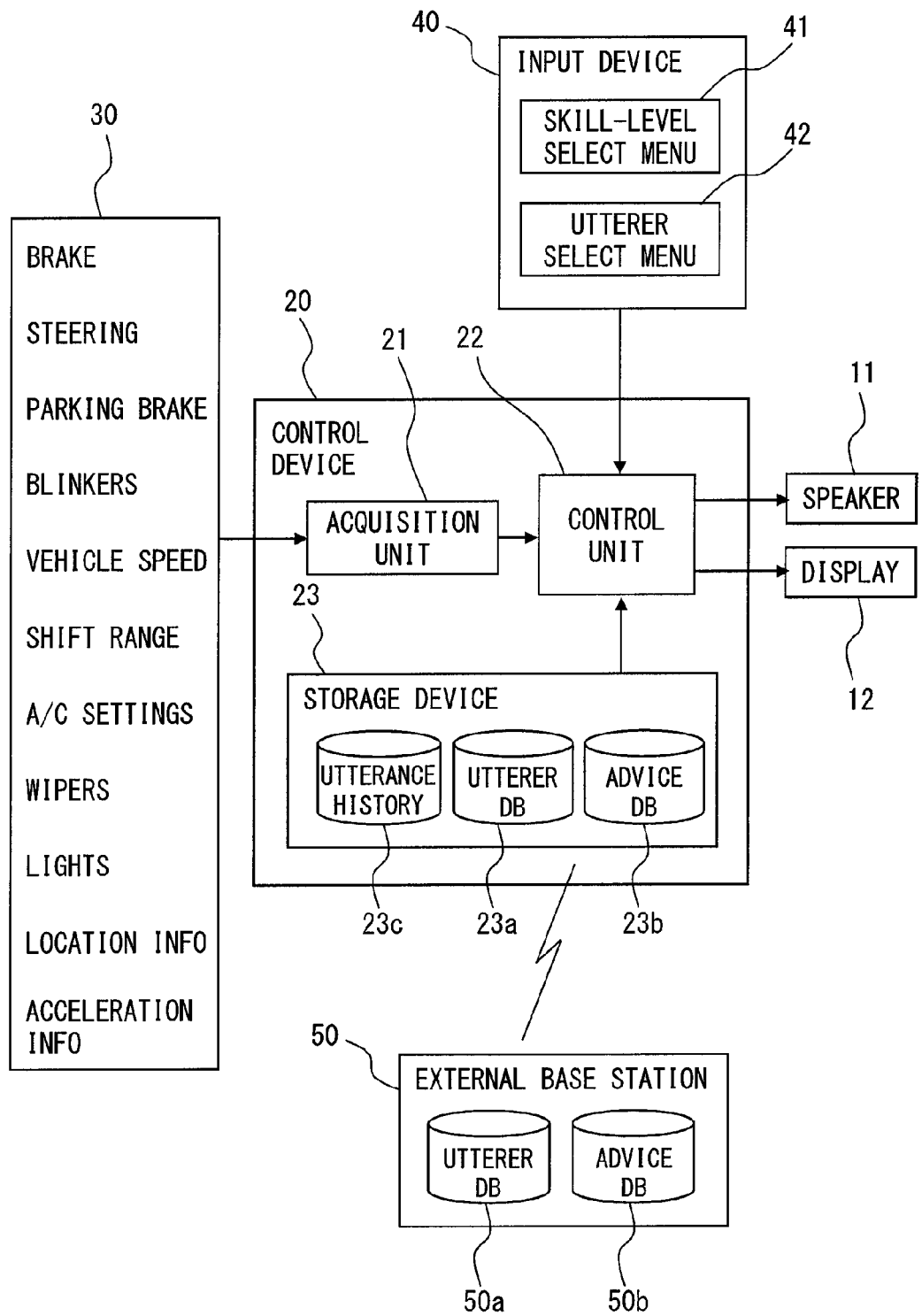
FIG. 1 is a block diagram illustrating an information provision device for a vehicle in accordance with a first embodiment.

An information provision device for a vehicle according to a first embodiment includes a loudspeaker 11, a display 12, a control device 20, and an input device 40 as shown in FIG. 1. The loudspeaker 11 and the display 12 are output devices that are disposed in a vehicle compartment to generate an audio or video output for the purpose of reporting notification information, which is described below, to a driver of the vehicle. The notification information includes advice information Q1 about contents of a driving operation, various road information Q2, and running area information Q3. The road information Q2 includes running route guidance information and traffic congestion information. The running area information Q3, which is the information about an area where the vehicle is running, includes relevant facility guidance information and regional driving characteristics such as a habit of allowing right-turning vehicles to take precedence.

The advice information Q1 is issued in the following cases. Suppose that an operation for starting or stopping the vehicle is performed. In this case, if the vehicle does not exhibit a significant front-rear rocking motion, an advice is issued to indicate that a desirable driving operation has been performed. If, on the other hand, the vehicle exhibits a significant rocking motion, an advice is issued to indicate it (see FIG. 4).

Suppose that the vehicle runs on a curve. In this case, if an actual steering operation is not significantly different from a minimum required steering operation (ideal operation) along the course of the road, an advice is issued to indicate that a desirable driving operation has been performed. If a significant difference is encountered, an advice is issued to indicate it (see FIG. 5).

Suppose that the vehicle cuts in in front of another vehicle in an attempt to change lanes. In this case, if the vehicle cuts in after being sufficiently accelerated, an advice is issued to indicate that a desirable driving operation has been performed. If, on the other hand, the vehicle is not sufficiently accelerated, an advice is issued to indicate it (see FIG. 6).

Suppose that the vehicle passes through a wireless communication gate of an electronic toll collection system. In this case, if the vehicle is sufficiently decelerated before it passes through the gate, an advice is issued to indicate that a desirable driving operation has been performed. If, on the other hand, the vehicle is not sufficiently decelerated, an advice is issued to indicate it.

An advice is issued to indicate the proper timing of refueling, based on, for instance, the distance between the current vehicle location and a refueling station, the mileage, and the amount of remaining fuel. An advice is issued to indicate the proper timing of taking a break, based on, for instance, the continuous running time of the vehicle, the mileage, and the running time zone.

The input device 40 is used by the driver of the vehicle in order to perform an input operation. More specifically, the input device 40 displays a menu 41 for selecting the level of driving skill P1 and a menu 42 for selecting a speaker P2 that outputs a voice message from the loudspeaker 11. The input device 40 is configured so that the driver can select a favorite speaker P2 from the menu 41 and input the level of driving skill P1 from the menu 42. The input device 40 may incorporate a display 12 and used as an input/display device.

The control device 20 includes an acquisition unit (corresponding to an exemplary acquisition means) 21 that acquires values detected by various sensors mounted in the vehicle. The acquisition unit 21 acquires, for example, vehicle speed, a selected shift range, air-conditioner settings, the operating states of a brake, a steering, a parking brake, blinkers, wipers, and lights, GPS-derived location information about the vehicle, and acceleration information.

The control device 20 includes a control unit (corresponding to an exemplary control means) 22 that controls the operation of the loudspeaker 11 and of the display 12 based on vehicle information (driving operation information) acquired by the acquisition unit 21 and information input from the input device 40. The control unit 22 includes a microcomputer with, for example, a well-known central processing unit and a memory. The microcomputer performs arithmetic processing operations to control the loudspeaker 11 and the display 12.

Figure 2:
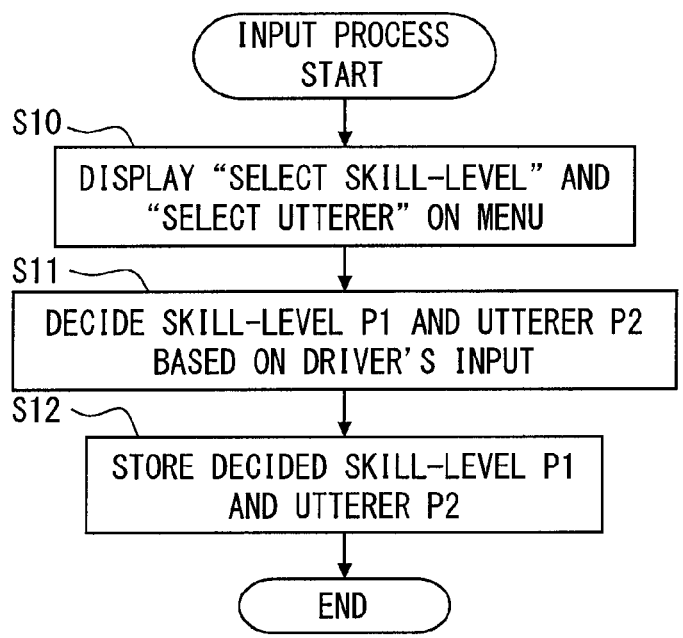
FIG. 2 is a flowchart illustrating input processing steps that are performed by a control unit shown in FIG. 1.

Control provided by the control unit 22 will now be described with reference to FIGS. 2 to 7. The flowchart of FIG. 2 illustrates a process performed to determine the level of driving skill P1 and the speaker P2, which represent the preferences of the driver. This process is performed by the control unit 22 when the driver starts driving the vehicle, for example, by turning on an ignition switch.

First of all, in step S10 of FIG. 2, the control unit 22 causes the input device 40 to display the aforementioned level-of-driving-skill selection menu 41 and speaker selection menu 42 and prompts the driver to selectively input the level of driving skill P1 and the speaker P2. The speaker selection menu 42 is configured so that a plurality of speakers are selectable. For each selectable speaker, gender, personality, voice tone, language, and dialect are preset. Thus, even when the same voice message is output, a manner in which the voice message is generated varies with the selected speaker P2. For example, the voice message is output in a language used by the selected speaker (Japanese, English, or other language).

Next, in step S11, the control unit 22 determines the level of driving skill P1 and the speaker P2 based on the input from the driver. Subsequently, in step S12, the control unit 22 stores the level of driving skill P1 and the speaker P2, which were determined in step S11. For example, a memory possessed by the control unit 22 temporarily stores the level of driving skill P1 and the speaker P2, which were determined in step S11.

The control device 20 includes a hard disk or other non-volatile storage device 23. The storage device 23 stores a speaker database 23a, an advice database 23b, and a voice message history database 23c. The speaker database 23a includes a collection of data on a plurality of different speakers P2. The advice database 23b includes a collection of data on a plurality of different kinds of advice information Q1. The voice message history database 23c is a history of voice messages output from the loudspeaker 11.

The control device 20 also includes a data reception unit (an exemplary data reception means and not shown) that wirelessly receives data from a speaker database 50a and an advice database 50b. The speaker database 50a and the advice database 50b are stored in an external base station 50. Thus, the contents of the databases 50a, 50b stored in the external base station 50 can be added to or used to change the contents of the databases 23a, 23b stored in the storage device 23.

In step S10 of FIG. 2, the control unit 22 displays the speaker selection menu 42 based on the speaker database 23a so as to permit the driver to select from a plurality of different speakers stored in the speaker database 23a.

Figure 3:
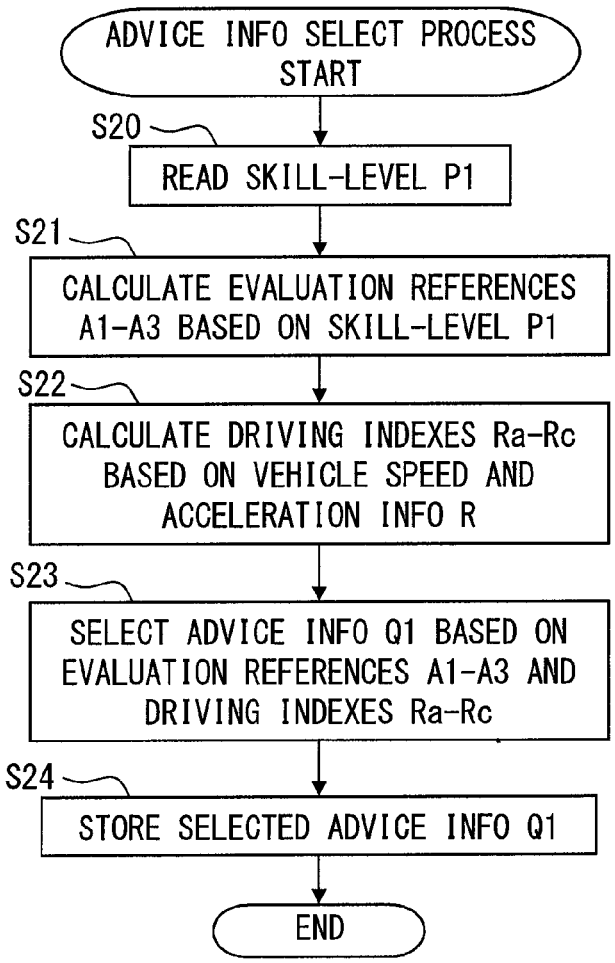
FIG. 3 is a flowchart illustrating advice information selection processing steps that are performed by the control unit shown in FIG. 1.

The flowchart of FIG. 3 illustrates a process in which the advice information Q1 to be reported to the driver is selected from a plurality of information items. This process is repeatedly performed at predetermined intervals by the control unit 22 (microcomputer) after completion of the process shown in FIG. 2. The predetermined intervals may be, for example, the computation intervals of the microcomputer.

Figure 4:
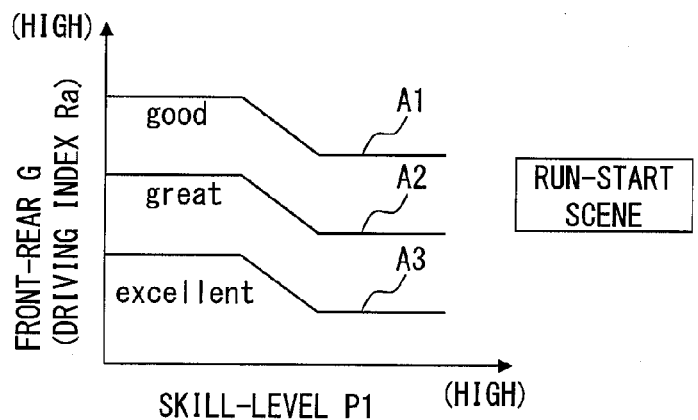
FIG. 4 is a diagram illustrating a threshold map that is used in an advice selection process shown in FIG. 3 and related to an advice on a vehicle start scene.
Figure 5:
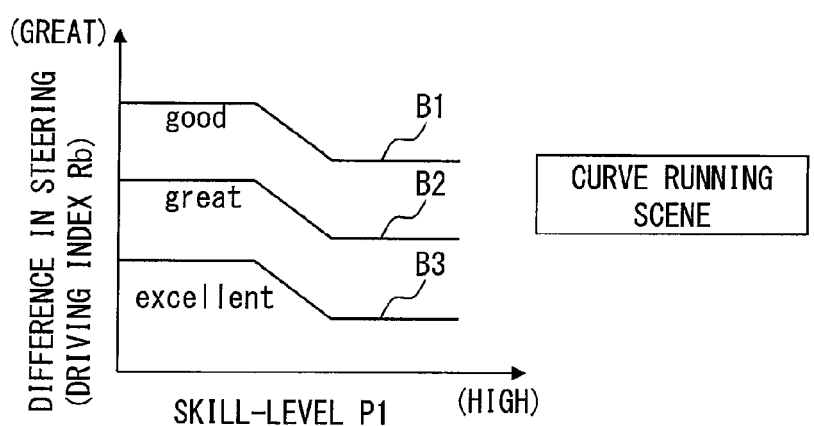
FIG. 5 is a diagram illustrating a threshold map that is used in the advice selection process shown in FIG. 3 and related to an advice on a curve running scene.
Figure 6:
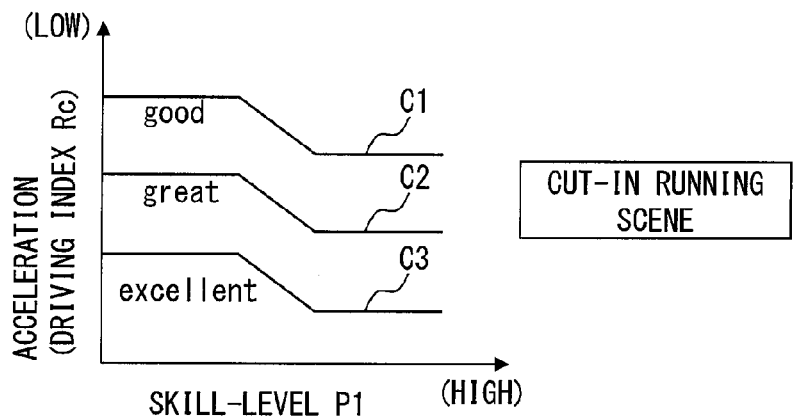
FIG. 6 is a diagram illustrating a threshold map that is used in the advice selection process shown in FIG. 3 and related to an advice on a cut-in running scene.

First of all, in step S20 of FIG. 3, the control unit 22 accesses the memory and reads the level of driving skill Pb, which was determined and stored in the process shown in FIG. 2. Next, in step S21, the control unit 22 calculates evaluation reference values A1, A2, A3, B1, B2, B3, C1, C2, C3, which are shown in FIGS. 4, 5, and 6, based on the read level of driving skill Pb. Subsequently, in step S22, the control unit 22 calculates operation indexes Ra, Rb, Rc based on the vehicle information (driving operation information) acquired by the acquisition unit 21.

Next, the control unit 22 in step S23 (corresponding to an exemplary information selection unit or information selection means) selects the advice information Q1 to report, from a plurality of advice information items stored in the advice database 23b, based on the evaluation reference values A1-A3, B1-B3, C1-C3 and the operation indexes Ra-Rc. More specifically, as exemplified below, the control unit 22 compares the operation indexes Ra, Rb, Rc, which are obtained by quantifying contents of the driving operations, against the evaluation reference values A1-A3, B1-B3, C1-C3, and selects the advice information Q1 as the notification information.

If, for example, the vehicle does not exhibit a significant front-rear rocking motion when the vehicle starts, the control unit 22 selects advice information Q1 indicative of a desirable driving operation. The less significant the rocking motion, the higher the degree of desirability indicated by the advice information Q1 selected by the control unit 22.

In short, the driver is praised when the vehicle starts with an insignificant rocking motion, and the smaller the amount of rocking motion, the higher the degree to which the driver is praised. In the example of FIG. 4, the front-rear acceleration (front-rear G) of the vehicle at startup is used as the aforementioned operation index Ra about rocking. The advice information Q1 selected by the control unit 22 indicates a "good" driving operation if the front-rear G value is smaller than the evaluation reference value A1 and not smaller than the evaluation reference value A2. The advice information Q1 selected by the control unit 22 indicates a "great" driving operation if the front-rear G value is smaller than the evaluation reference value A2 and not smaller than the evaluation reference value A3. The advice information Q1 selected by the control unit 22 indicates an "excellent" driving operation if the front-rear G value is smaller than the evaluation reference value A3.

Further, if an actual steering operation is not significantly different from a minimum required steering operation (ideal operation) along the course of the road when the vehicle runs on a curve, the control unit 22 selects advice information Q1 indicative of a desirable driving operation. The smaller the difference, the higher the degree of desirability indicated by the advice information Q1 selected by the control unit 22 (see FIG. 5).

In short, the driver is praised if the steering operation performed during running of the vehicle on a curve has a small difference from the ideal operation, and the smaller the difference, the higher the degree to which the driver is praised. In the example of FIG. 5, the aforementioned difference encountered when the vehicle runs on a curve is used as the operation index Rb. The advice information Q1 selected by the control unit 22 indicates a "good" driving operation if the difference value is smaller than the evaluation reference value B1 and not smaller than the evaluation reference value B2. The advice information Q1 selected by the control unit 22 indicates a "great" driving operation if the difference value is smaller than the evaluation reference value B2 and not smaller than the evaluation reference value B3. The advice information Q1 selected by the control unit 22 indicates an "excellent" driving operation if the difference value is smaller than the evaluation reference value B3.

Furthermore, if the vehicle cuts in in front of another vehicle in an attempt, for instance, to change lanes after being sufficiently accelerated, the control unit 22 selects advice information Q1 indicative of a desirable driving operation. The greater the acceleration, the higher the degree of desirability indicated by the advice information Q1 selected by the control unit 22 (see FIG. 6).

In short, the driver is praised if the vehicle performs a cut-in running operation after being sufficiently accelerated, and the greater the acceleration, the higher the degree to which the driver is praised. In the example of FIG. 6, the acceleration applied when the vehicle performs a cut-in running operation is used as the operation index Rc. The advice information Q1 selected by the control unit 22 indicates a "good" driving operation if the acceleration value is smaller than the evaluation reference value C1 and not smaller than the evaluation reference value C2. The advice information Q1 selected by the control unit 22 indicates a "great" driving operation if the acceleration value is smaller than the evaluation reference value C2 and not smaller than the evaluation reference value C3. The advice information Q1 selected by the control unit 22 indicates an "excellent" driving operation if the acceleration value is smaller than the evaluation reference value C3.

The evaluation reference values A1-A3 B1-B3, C1-C3 shown in FIGS. 4 to 6 vary with the level of driving skill P1 that was read in step S20. In the examples of FIGS. 4 to 6, the higher the level of driving skill P1, the lower the settings of the evaluation reference values A1-A3 B1-B3, C1-C3. Therefore, the higher the level of driving skill P1, the less likely the driver is praised to a high degree. In short, if a high level of driving skill P1 is selected for the driver from the level-of-driving-skill selection menu 41, the driver will not easily be highly evaluated and praised.

Returning to FIG. 3, in step S24, the control unit 22 stores the advice information Q1 selected in step S23. For example, a memory possessed by the control unit 22 (microcomputer) temporarily stores the advice information Q1 selected in step S23.

Figure 7:
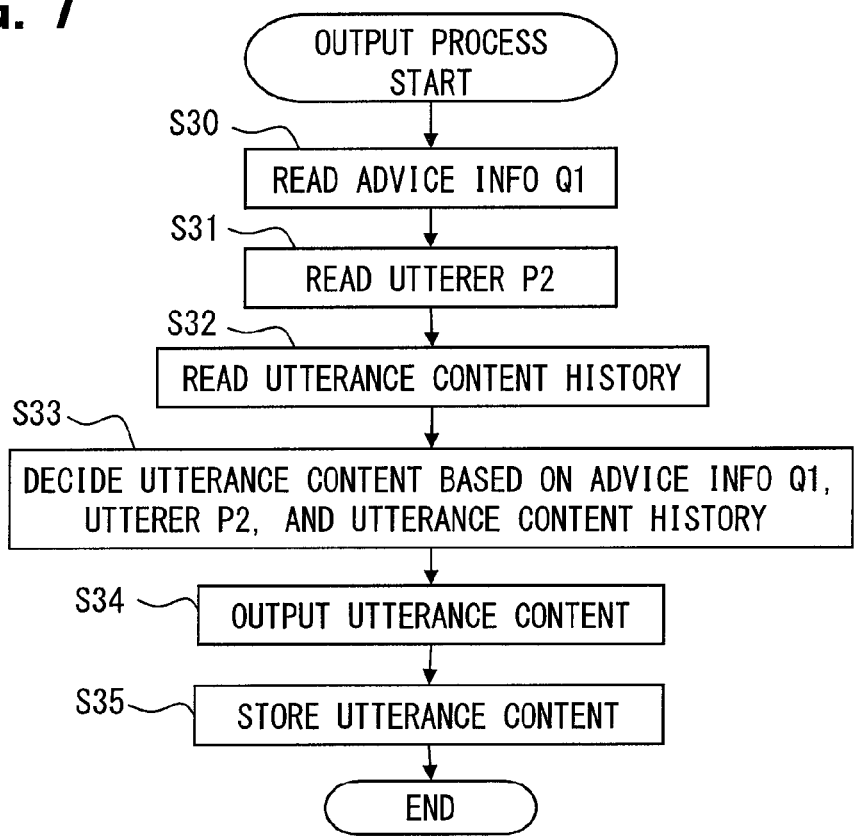
FIG. 7 is a flowchart illustrating output processing steps that are performed by the control unit shown in FIG. 1.

The flowchart of FIG. 7 illustrates a process in which a voice message to be reported to the driver is determined and output. This process is repeatedly performed at predetermined intervals by the control unit 22 (microcomputer). The predetermined intervals may be, for example, the computation intervals of the microcomputer. If the advice information selected by the process shown in FIG. 3 is changed after the determined voice message is output from the loudspeaker 11, the process shown in FIG. 7 may be started.

First of all, in step S30 of FIG. 7, the control unit 22 accesses the memory and reads the advice information Q1 stored in step S24 of FIG. 3. Next, in step S31, the control unit 22 accesses the memory and reads the speaker P2 stored in step S12 of FIG. 2. Subsequently, in step S32, the control unit 22 accesses the memory and reads a voice message history stored in later-described step S35. Then, the control unit 22 in step S33 (corresponding to an exemplary preference determination unit or preference determination means) determines the voice message based on the read advice information Q1, speaker P2, and voice message history.

For example, the control unit 22 determines the voice message in such a manner that the advice information, such as "great", is spoken in the manner according to the selected speaker P2. If, for instance, the selected speaker P2 is defined to have a gentle personality, the loudspeaker 11 outputs the voice message "great" by using a female voice having a gentle tone. If, on the other hand, the selected speaker P2 is defined to having a passionate personality, the loudspeaker 11 outputs the voice message "great!" by using a forceful male voice having an encouraging tone.

Further, if the voice message history indicates that the operation indexes Ra-Rc are improved over the previous event, the control unit 22 causes the loudspeaker 11 to audibly output the advice information Q1 "greater than before" instead of the advice information Q1 "great".

Next, the control unit 22 in step S34 (corresponding to an exemplary output control unit or output control means) controls the operation of the loudspeaker 11 and of the display 12 so that the loudspeaker 11 audibly outputs the voice message determined in step S33, and that the display 12 visibly outputs the same voice message. Subsequently, in step S35, the control unit 22 causes the storage device 23 to store the voice message output in step S34. As the stored voice message is retained, the voice message history database 23c is established in the storage device 23.

As described above, the present embodiment selects the advice information Q1 from the database 23b based on the operation indexes Ra, Rb, Re (contents of driving operations) and causes the driver's favorite speaker P2 to audibly or visibly report the selected advice information Q1. Therefore, the advice information Q1 indicative, for instance, of a desirable driving operation can be provided to the driver in a manner that does not bore the driver.

Further, the present embodiment having the following configurations provides operational advantages, which are described in conjunction with each configuration.

<Configuration 1>

The advice information Q1 (the notification information) selected in step S23 (corresponding to the exemplary information selection unit or information selection means) varies with the level of driving skill P1 (preference) determined in step S11. In the examples of FIGS. 4 to 6, the advice information Q1 is selected so that the lower the level of driving skill P1, the higher the degree to which the driver is praised. In this configuration, the advice information Q1 is selected based on the level of driving skill (preference). Therefore, the advice information Q1 can be provided to the driver in a manner that does not bore the driver.

<Configuration 2>

The reporting manner determined in step S33 (corresponding to the exemplary preference determination unit or preference determination means) is represented at least one of the speaker's gender, personality, voice tone, language, and dialect. This makes it easy to provide the advice information Q1 to the driver in a manner that does not bore the driver.

<Configuration 3>

Step S33 (corresponding to the exemplary preference determination unit or preference determination means) determines the reporting manner based on information that is input to the input device 40 by the driver. It means that preferences, such as the level of driving skill P1 and the speaker P2, can be set by the driver. This ensures that reporting is performed in a manner hat matches the preferences of the driver.

<Configuration 4>

The notification information includes the advice information Q1 with respect to the operation indexes Ra, Rb, Rc (contents of driving operations). Voice messages providing this type of advice information are likely to be boring. Therefore, preferred effects are produced when the advice information is reported by the driver's favorite speaker P2.

<Configuration 5>

Step S33 (corresponding to the exemplary preference determination unit or preference determination means) determines the reporting manner based on the history of advice information Q1 (the notification information) reported by the output devices. It means that the voice message to be output is determined in consideration of previously provided information. This makes it easy to provide the advice information Q1 to the driver in a manner that does not bore the driver.

(Second Embodiment)

In the first embodiment described above, the preferences, such as the level of driving skill P1, are input by the driver through the input device 40. In this regard, a second embodiment includes an estimation unit (estimation means) to estimate the level of driving skill P1 (preference), selects advice information Q1 based on the estimated preferences, and determines a voice message to output.

Figure 8:
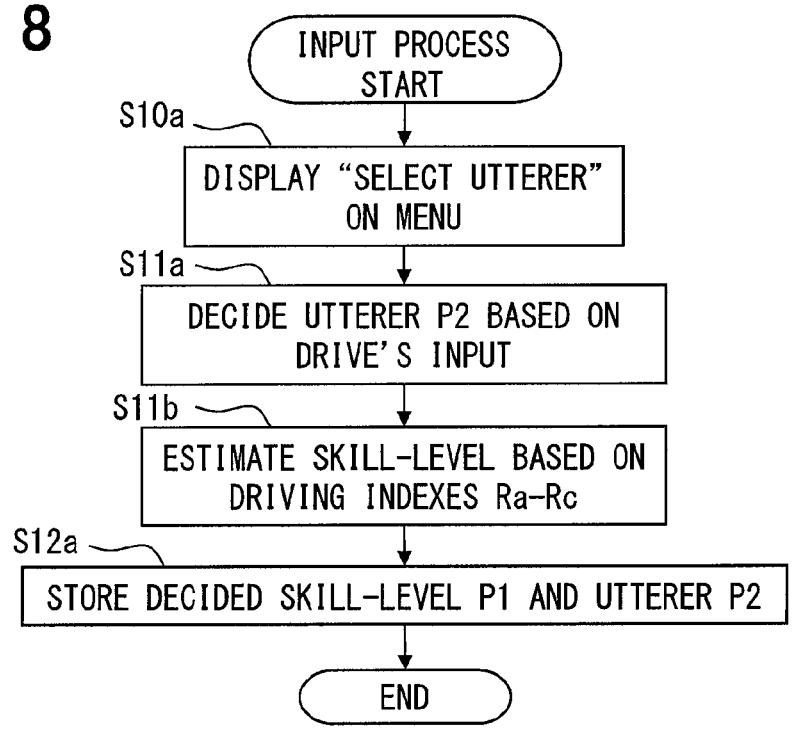
FIG. 8 is a flowchart illustrating input processing steps that are performed in a second embodiment.

More specifically, the control unit 22 (microcomputer) performs a process shown in FIG. 8 instead of the process shown in FIG. 2.

First of all, in step S10a of FIG. 8, the control unit 22 does not display the level-of-driving-skill selection menu 41, but displays the speaker selection menu 42 on the input device 40 to prompt the driver to selectively input a speaker P2. Next, in step S11a, the control unit 22 determines the speaker P2 based on information input by the driver. Subsequently, the control unit 22 in step S11b (corresponding to an exemplary estimation unit or estimation means) estimates the level of driving skill P1 based on the operation indexes Ra-Rc calculated in step S22 of FIG. 3. Alternatively, in step S11b, the control unit 22 may estimate the level of driving skill P1 based on the history of the selected advice information Q1. Next, in step S12a, the control unit 22 stores the speaker P2 determined in step S11a and the level of driving skill P1 estimated in step S11b.

According to the present embodiment described above, step S33 (corresponding to the exemplary preference determination unit or preference determination means) estimates the preferences of the driver based on contents of vehicle driving operations and determines the aforementioned reporting manner based on the estimated preferences. This saves the driver the bother of inputting the preferences.

(Third Embodiment)

A third embodiment causes an output device (loudspeaker 11) to output sound effects in addition to a voice message. The sound effects may be output at the same timing as the voice message or immediately before or after the voice message. In any case, the voice message and sound effects are output so that the voice message is recognized in association with the sound effects. Further, the output device is configured to be able to switch between a first mode and a second mode. In the first mode, a voice message is output together with sound effects. In the second mode, sound effects are output without outputting a voice message.

In the third embodiment, if the notification information, which is to be reported, is different from previously reported information when a voice message is to be output in step S34 of FIG. 7, the control unit 22 selects the first mode and outputs the voice message and sound effects (corresponding to the exemplary output control unit or output control means). If, on the other hand, the notification information, which is to be reported, is the same as the previously reported information, the control unit 22 selects the second mode and outputs the sound effects only.

Incidentally, if, for instance, the driver is continuously performing a desirable driving operation in a situation where the notification information is the advice information Q1 and a driving advice is reported at predetermined time intervals or at predetermined mileage intervals, the following problem may occur. If control is constantly exercised in the first mode without regard to the above-described control scheme, the same voice message "excellent" is output at all times. In such a case, the driver may be bothered by the voice message.

In view of the above circumstances, the present embodiment permits the output device to switch between the first mode and the second mode. The first mode reports information by outputting a voice message and sound effects. The second mode reports information by outputting the sound effects without outputting the voice message. If the notification information is different from previously reported information, the control unit 22 (step S34) exercises control to operate the output device in the first mode. On the other hand, if the notification information is the same as the previously reported information, the control unit 22 (step S34) exercises control to operate the output device in the second mode.

Consequently, the above-described control scheme inhibits the same voice message from being output at all times. This prevents the driver from being bothered. Further, sound effects are output in association with a voice message when the voice message is output for the first time, and the second mode outputs the sound effects. This enables the driver to not only recognize that the same sound effects are output, but also recognize that the currently reported advice is the same as the previously reported one. As a result, the advice can be reported to the driver without bothering the driver.

Although the foregoing description relates to the advice information Q1, the control scheme described in conjunction with the present embodiment can also be applied to a situation where the aforementioned road information Q2 or running area information Q3 is to be reported.

(Fourth Embodiment)

In an embodiment shown in FIGS. 2 and 3, the level of driving skill P1 (preference), which is used to set the evaluation reference values A1-A3, B1-B3, C1-C3, is determined based on information input by the driver. In a fourth embodiment, the evaluation reference values are automatically changed based on the history of evaluations derived from the comparison between the operation indexes Ra, Rb, Rc and the evaluation reference values.

In an embodiment shown in FIG. 4, contents of driving operations quantified as the operation index Ra are evaluated based on the three evaluation reference values A1, A2, A3 and sorted into three different levels, namely, "good", "great", and "excellent". In the fourth embodiment shown in FIG. 9, the contents of driving operations are evaluated based on four evaluation reference values A0, A1, A2, A3 and sorted into five different levels, namely, "Abrupt acceleration/deceleration", "OK", "Good", "Great", and "Excellent". If the front-rear G value is not smaller than the evaluation reference value A0, "Abrupt acceleration/deceleration" is selected as the advice information Q1. If, on the other hand, the front-rear G value is smaller than A0 and not smaller than the evaluation reference value A1, "OK" is selected as the advice information Q1. Although not shown in the figure, as regards the difference in steering shown in FIG. 5 and the acceleration shown in FIG. 6, the contents of driving operations are evaluated and sorted into the same five different levels as shown in FIG. 9.

Figure 10:
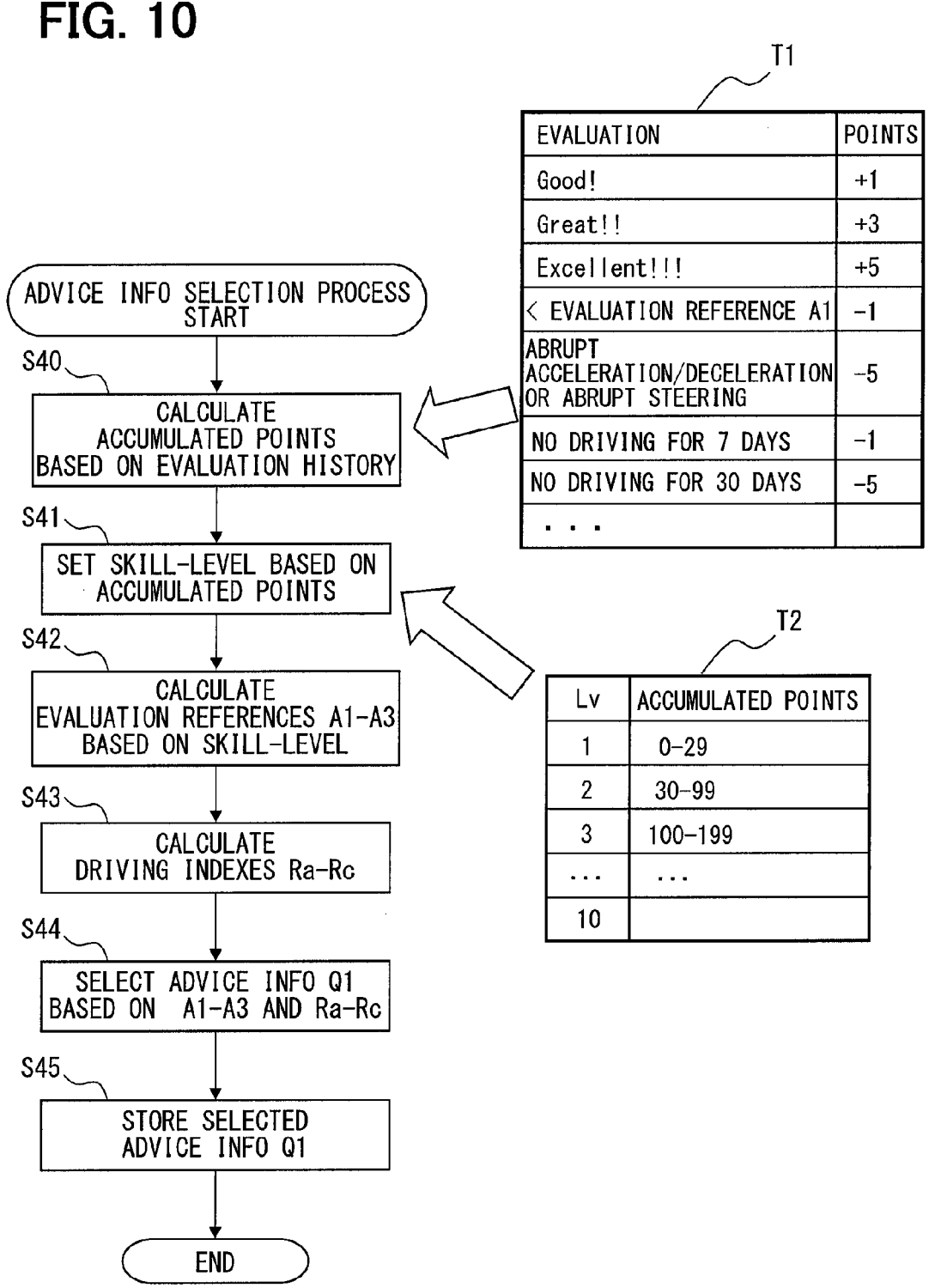
FIG. 10 is a flowchart illustrating advice information selection processing steps that are performed in the fourth embodiment.

Further, in the present embodiment, the process shown in FIG. 3 is changed to a process shown in FIG. 10. First of all, in step S40 of FIG. 10, the control unit 22 calculates the number of accumulated points based on the history of evaluations. More specifically, the number of points corresponding to the evaluations is cumulatively calculated based on values in a table T1 (see FIG. 10) that is stored in the storage device 23. The number of points is cumulatively calculated each time a predetermined period of time is exceeded by the running time of the vehicle. The table T1 is set so that the higher the evaluation, the greater the number of points. The number of points corresponding to an "OK" evaluation is set to be zero. If the evaluation is higher than "OK", the number of accumulated points is increased. If, on the other hand, the evaluation is lower than "OK", the number of accumulated points is decreased. Further, if the vehicle has not been driven for a long period of time so that no evaluation has been made for an extended period of time, the number of accumulated points is considerably decreased.

Figure 9:
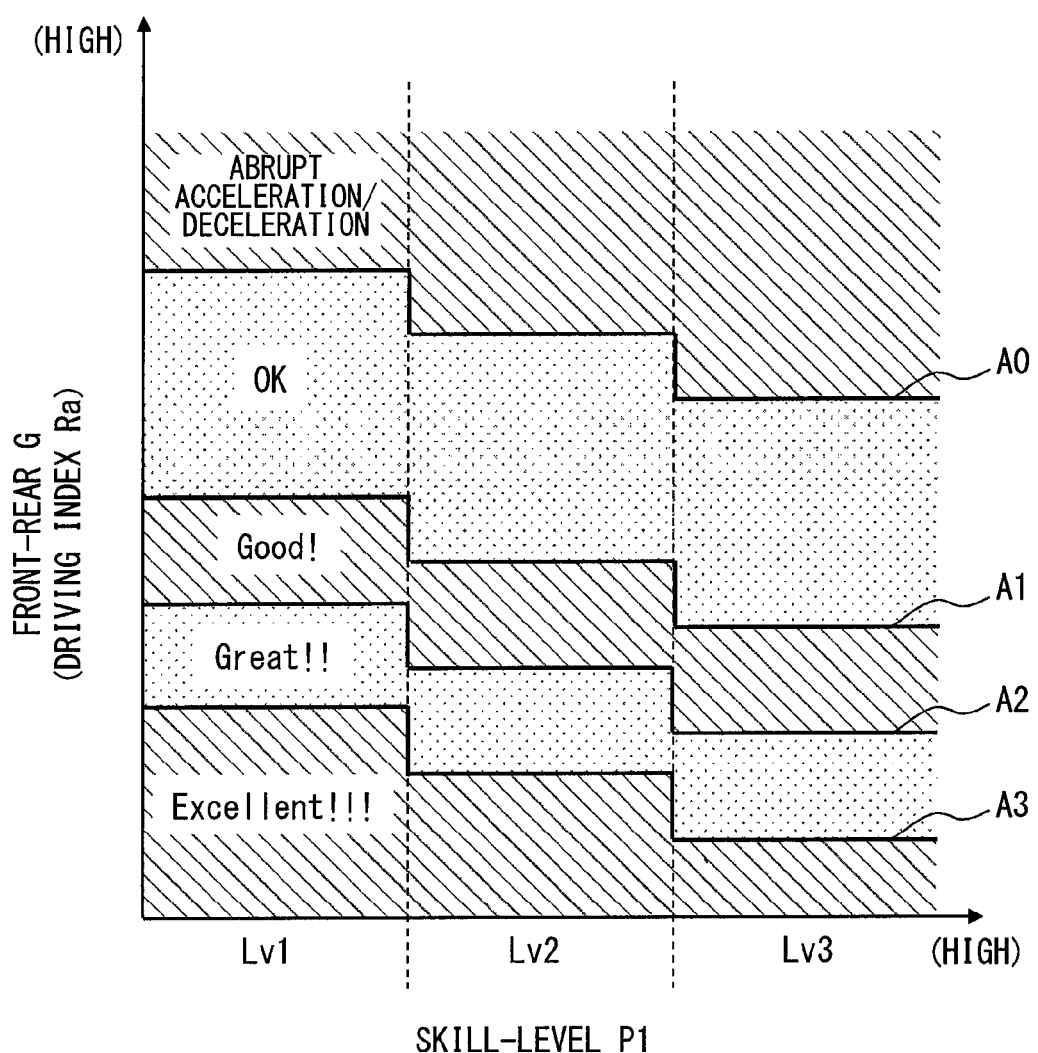
FIG. 9 is a threshold map that is used in the advice selection process shown in FIG. 10 in accordance with a fourth embodiment and related to an advice on a vehicle acceleration/deceleration scene.

As shown in FIG. 9, the value indicative of the level of driving skill P1 is classified into a plurality of regions. Each region is referred to as a driving skill level. Each driving skill level is associated with the number of accumulated points. The relationship between the driving skill level and the number of accumulated points is defined in a table T2 (see FIG. 10) that is stored in the storage device 23. In step S41 of FIG. 10, the control unit 22 references the table T2 and sets the driving skill level based on the number of accumulated points that was calculated in step S40.

Next, the control unit 22 in step S42 (corresponding to an exemplary reference value change unit or reference value change means) references a map shown in FIG. 9 and calculates the evaluation reference values A0-A3 based on the driving skill level set in step S41. The control unit 22 also calculates the other evaluation reference values B0-B3, C0-C3 based on the driving skill level set in step S41. The example of FIG. 9 is set so that the higher the driving skill level, the more stringent the evaluation values A0-A3, the more difficult to obtain high evaluation. Subsequently, in step S43, the control unit 22 calculates the operation indexes Ra, Rb, Rc based on the vehicle information (driving operation information) acquired by the acquisition unit 21, as is the case with step S22 of FIG. 3.

Next, in step S44 (corresponding to the exemplary information selection unit or information selection means), based on the evaluation reference values A0-A3, B0-B3, C0-C3 and the operation indexes Ra-Rc, the control unit 22 checks a plurality of advice information items stored in the advice database 23b and selects the advice information Q1 to report. More specifically, the control unit 22 compares the operation indexes Ra, Rb, Rc against the evaluation reference values A0-A3, B0-B3, C0-C3 and selects the advice information Q1 to be used as the notification information. Subsequently, in step S45, the control unit 22 stores the advice information Q1 selected in step S44.

While performing the process in step S42, the control unit 22 can provide a reference value change unit or a reference value change means that automatically change the evaluation reference values A0-A3 based on the history of evaluations. While performing the process in step S44, the control unit 22 can provide an information selection unit or an information selection means that select the advice information Q1 based on contents of driving operations.

As described above, according to the present embodiment, the evaluation reference values A0-A3 are automatically changed based on the history of evaluations. Therefore, even if the same driving operations have been performed, different evaluations are reported depending on the history of evaluations.

For example, the evaluation reference values A0-A3 are automatically changed so that the higher the evaluation of the history of evaluations, the more difficult to obtain high evaluation next time. Thus, a driver having desirable operation indexes is forced to feel that it is not easy to obtain high evaluation. This will motivate the driver to obtain higher operation indexes. Further, the evaluation reference values A0-A3 are automatically changed so that the lower the evaluation of the history of evaluations or the longer the period of no evaluation, the easier to obtain high evaluation next time. Thus, a driver having undesirable operation indexes is forced to feel that it is possible to obtain high evaluation. This will motivate the driver to obtain high operation indexes.

As described above, according to the present embodiment, the advice information Q1 indicative, for instance, of a desirable driving operation can be provided to a driver in a manner that does not bore the driver no matter whether the driver has desirable operation indexes or undesirable operation indexes.

(Fifth Embodiment)

Figure 11:
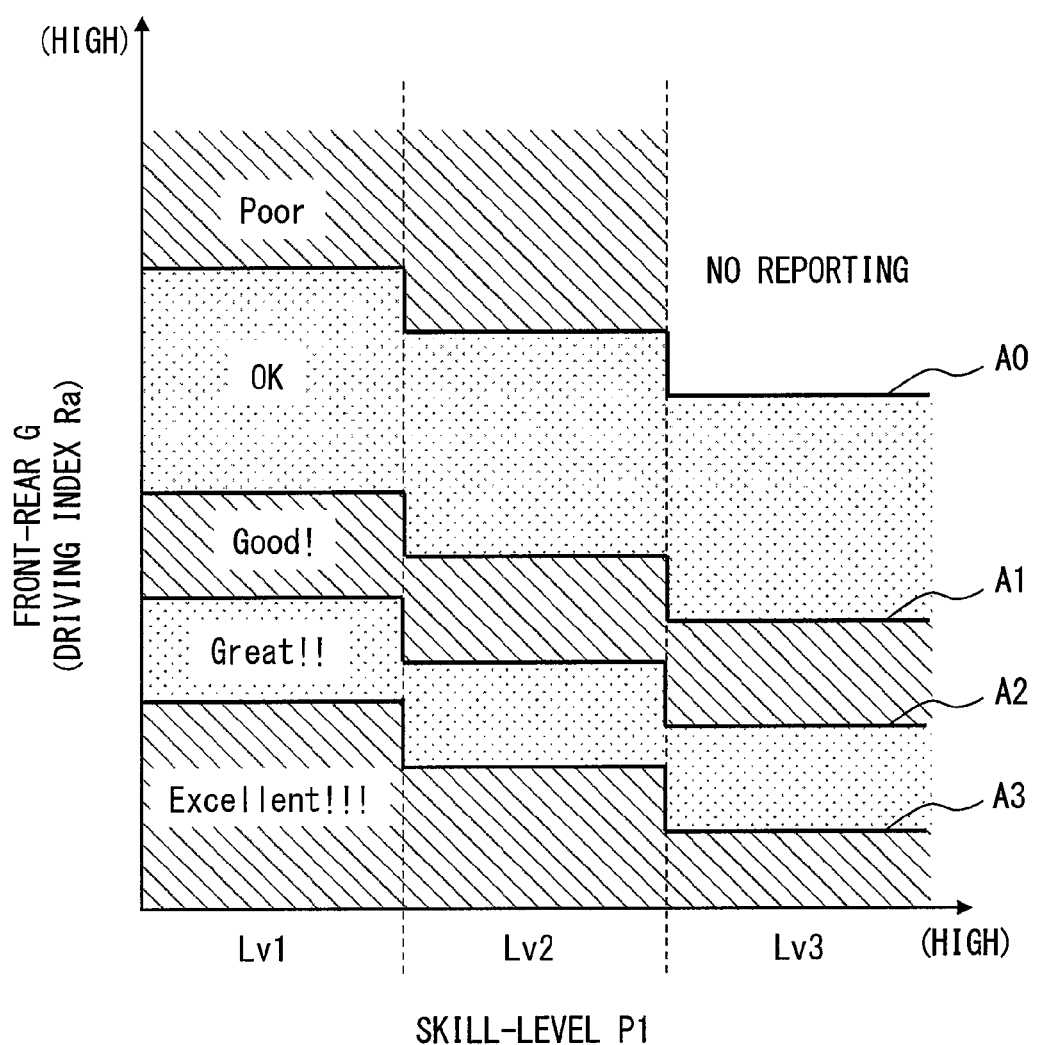
FIG. 11 is a diagram illustrating a threshold map that is used in the advice selection process in a fifth embodiment and related to an advice on a vehicle acceleration/deceleration scene.

As shown in FIG. 11, a fifth embodiment selects advice information Q1 indicative of a "poor" driving operation if the front-rear G value is not smaller than the evaluation reference value A0, selects advice information Q1 indicative of an "OK" driving operation if the front-rear G value is smaller than the evaluation reference value A0 and not smaller than the evaluation reference value A1, selects advice information Q1 indicative of a "good" driving operation if the front-rear G value is smaller than the evaluation reference value A1 and not smaller than the evaluation reference value A2, selects advice information Q1 indicative of a "great" driving operation if the front-rear G value is smaller than the evaluation reference value A2 and not smaller than the evaluation reference value A3, and selects advice information Q1 indicative of an "excellent" driving operation if the front-rear G value is smaller than the evaluation reference value A3. In short, a negative advice is reported as the notification information if the front-rear G value is not smaller than A0, and a positive advice is reported as the notification information if the front-rear G value is smaller than A1.

As the evaluation reference values A0-A3 are changed based on the level of driving skill P1, the obtained evaluation varies with the changed evaluation reference values A0-A3 even if the operation indexes Ra, Rb, Rc remain unchanged. If, under such circumstances, particular conditions are met by the evaluation reference values and by the obtained evaluation, the loudspeaker 11 and the display 12 are inhibited from reporting. For example, the particular conditions may be such that the obtained evaluation is "poor" when the level of driving skill is not lower than level 3 (see FIG. 11). In such an instance, negative reporting of a "poor" driving operation is inhibited.

If the above-described reporting is not inhibited, a negative advice is reported to a driver having a high level of driving skill P1 as the evaluation reference values A0-A3 are changed to stringent values. In such an instance, the driver having a high level of driving skill may be demotivated from obtaining higher operation indexes. On the other hand, the present embodiment fixes the above problem because it refrains from reporting a negative advice that is attributable to a high level of driving skill.

(Other Embodiments)

The present disclosure is not limited to the foregoing embodiments. The foregoing embodiments may be modified as described below for implementation. Further, technical elements of the foregoing embodiments may be combined as desired.

In the example of FIG. 7, the advice information Q1 is output as the notification information to the driver. Alternatively, the aforementioned road information Q2 or running area information Q3 may be output. In such an instance, too, the information Q2, Q3 is provided to the driver without boring the driver by varying the output manner of voice message and displayed message based on the determined speaker P2 or the level of driving skill P1, as is the case with the advice information Q1.

In the example of FIG. 1, the loudspeaker 11 and the display 12 are both used as an output device. Alternatively, either one of them may be used.

In the first embodiment, the reporting manner of voice message or displayed message is determined based on a preference (level of driving skill P1) input by the driver. In the second embodiment, the reporting manner of voice message or displayed message is determined based on preferences estimated by the estimation unit. Alternatively, the reporting manner of voice message or displayed message may be determined based on both input preferences and estimated preferences. For example, an alternative is to determine the reporting manner by using input preferences as initial values, estimate changes in the preferences, and automatically change the reporting manner.

In the fourth embodiment, the number of points corresponding to evaluations is cumulatively calculated in step S40 of FIG. 10 each time a predetermined period of time is exceeded by the running time of the vehicle. Alternatively, the number of points corresponding to evaluations may be cumulatively calculated each time the mileage reaches a predetermined value or each time a vehicle operation is ended, for instance, by turning off an ignition switch of an internal combustion engine.

The invention claimed is:

1. An information provision device for a vehicle, comprising:
    an output device that reports notification information to a driver of the vehicle through an audible or visible message;
    an information selection unit that selects the notification information from among a plurality of information items based on content of a driving operation of the vehicle;
    a preference determination unit that determines a reporting manner of the audible or visual message in the output device based on preference of the driver; and
    an output control unit that controls the output device in such a way that the notification information, which is selected by the information selection unit, is reported in the reporting manner determined by the preference determination unit,
    wherein the information selection unit selects the notification information from among the plurality of information items based on (i) the preference of the driver and (ii) comparison between an operation index and an evaluation reference value,
        the operation index being a quantified value of the content of driving operation,
        the evaluation reference value being set based on the preference of the driver,
    the information provision device further comprising
    a reference value change unit that automatically changes the evaluation reference value based on a history of evaluations on the content of the driving operation,
        each evaluation being derived from the comparison between the operation index and the evaluation reference value,
    wherein:
    the reference value change unit automatically changes the evaluation reference value so that the higher the history of evaluations, the more difficult to obtain high evaluation next time; and
    the reference value change unit automatically changes the evaluation reference value so that the lower the history of evaluations or the longer a time period of no evaluation, the easier to obtain high evaluation next time.

2. The information provision device for the vehicle according to claim 1, wherein:
    the output device reports the notification information by reporting the evaluation derived from the comparison; and the notification information is inhibited from being reported when the evaluation reference value and the evaluation meet a particular condition in a situation where the evaluation vary with the evaluation reference value even if the operation index remains unchanged.

3. The information provision device for the vehicle according to claim 1, wherein:
the output device reports the audible message as the notification information to the driver; and
the reporting manner determined by the preference determination unit is represented by at least one of gender, personality, voice tone, language, and dialect of a speaker of the audible message.

4. The information provision device for the vehicle according to claim 1, further comprising:
an input device through which the driver inputs the preference,
wherein the preference determination unit determines the reporting manner based on information input to the input device by the driver.

5. The information provision device for the vehicle according to claim 1, further comprising:
an estimation unit that estimates the preference of the driver based on the content of the driving operation of the vehicle,
wherein the preference determination unit determines the reporting manner based on the preference estimated by the estimation unit.

6. The information provision device for the vehicle according to claim 1, wherein
the preference determination unit determines the mode of reporting based on the history of the notification information that is reported by the output device.

7. The information provision device for the vehicle according to claim 1, wherein:
the output device is switchable between
a first mode in which the output device provides the audible message and a sound effect for reporting, and
a second mode in which the output device provides the sound effect for reporting without outputting the audible message;
the output control unit makes the output device operate in the first mode when the notification information currently selected by the information selection unit is different from a previously reported notification information; and
the output control unit makes the output device operate in the second mode when the currently selected notification information is the same as the previously reported notification information.

8. The information provision device for the vehicle according to claim 1, wherein
the notification information is advice to the driver on the driving operation.

\* \* \* \* \*